US010317035B2

United States Patent
Shido (10) Patent No.: US 10,317,035 B2
(45) Date of Patent: Jun. 11, 2019

(54) LIGHT SOURCE DEVICE WITH PLANAR LIGHT SOURCE HAVING REDIRECTING OPTICAL MEMBER AND VEHICLE LAMP HAVING THE SAME

(71) Applicant: Koito Manufacturing Co., Ltd., Tokyo (JP)

(72) Inventor: Masaya Shido, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 109 days.

(21) Appl. No.: 15/470,970

(22) Filed: Mar. 28, 2017

(65) Prior Publication Data

US 2017/0292672 A1 Oct. 12, 2017

(30) Foreign Application Priority Data

Apr. 7, 2016 (JP) .................................. 2016-077242

(51) Int. Cl.
| | |
|---|---|
| *B60Q 1/30* | (2006.01) |
| *F21S 43/13* | (2018.01) |
| *F21S 43/33* | (2018.01) |
| *F21S 43/31* | (2018.01) |
| *B60Q 1/26* | (2006.01) |
| *F21S 43/19* | (2018.01) |
| *F21S 43/145* | (2018.01) |
| *F21S 43/20* | (2018.01) |
| *F21S 43/40* | (2018.01) |
| *F21Y 115/20* | (2016.01) |
| *B60Q 1/44* | (2006.01) |

(52) U.S. Cl.
CPC ............ *F21S 43/13* (2018.01); *B60Q 1/2607* (2013.01); *B60Q 1/30* (2013.01); *F21S 43/145* (2018.01); *F21S 43/195* (2018.01); *F21S 43/26* (2018.01); *F21S 43/31* (2018.01); *F21S 43/33* (2018.01); *F21S 43/40* (2018.01); *B60Q 1/302* (2013.01); *B60Q 1/44* (2013.01); *F21Y 2115/20* (2016.08)

(58) Field of Classification Search
CPC ........ F21S 41/24; F21S 43/145; F21S 43/236; F21S 43/239; F21S 43/241; F21S 43/243; F21Y 2107/00; F21Y 2107/10; F21Y 2107/20; F21Y 2107/70; F21Y 2105/00; F21V 2200/20; F21V 2200/40; G02B 6/0011; G02B 6/0066; G02B 6/0096; H01L 51/5271
See application file for complete search history.

(56) References Cited

U.S. PATENT DOCUMENTS

| | | | | |
|---|---|---|---|---|
| 2013/0200781 | A1* | 8/2013 | Forrest .................. | H05B 33/22 313/504 |
| 2014/0286034 | A1* | 9/2014 | Yamada ............... | B60Q 1/2607 362/518 |

FOREIGN PATENT DOCUMENTS

JP 2015-022917 A 2/2015

* cited by examiner

*Primary Examiner* — Anh T Mai
*Assistant Examiner* — Steven Y Horikoshi
(74) *Attorney, Agent, or Firm* — Abelman, Frayne & Schwab

(57) ABSTRACT

Provided is a light source device including: a planar light source provided with a light emitting curved surface; and an optical member that directs light from the light emitting curved surface toward a light emitting elongated region forming an angle with the light emitting curved surface.

18 Claims, 6 Drawing Sheets

LIGHT SOURCE DEVICE WITH PLANAR LIGHT SOURCE HAVING REDIRECTING OPTICAL MEMBER AND VEHICLE LAMP HAVING THE SAME

CROSS-REFERENCE TO RELATED APPLICATIONS

This application is based on and claims priority from Japanese Patent Application No. 2016-077242, filed on Apr. 7, 2016 with the Japan Patent Office, the disclosure of which is incorporated herein in its entirety by reference.

TECHNICAL FIELD

The present disclosure relates to a light source device and a vehicle lamp.

BACKGROUND

Attempts have been made to commercialize a vehicle lamp using an organic electroluminescence (EL) panel. The organic EL panel is also called an organic light emitting diode (OLED) panel.

For example, Japanese Patent Laid-Open Publication No. 2015-022917 discloses a vehicle lamp including an organic EL panel in which an elongated light emitting portion is provided at a peripheral edge of a glass substrate. The elongated light emitting portion is intended to be applied to a marker lamp such as, for example, a tail lamp. The light emitting portion includes a cathode layer, a transparent conductive film having an extending portion extending toward an outer periphery of the glass substrate, an organic light emitting layer sandwiched between the cathode layer and the transparent conductive film, and a metal electrode in contact with the extending portion of the transparent conductive film. The metal electrode is provided on the entire circumference of the glass substrate.

SUMMARY

According to the above configuration, since the organic light emitting layer is provided in the immediate vicinity of the metal electrode serving as an anode, a luminance reduction due to a voltage drop of the transparent conductive film may be minimized. Therefore, there is an advantage that the luminance of the elongated light emitting portion may be increased. However, the present inventors have found that there are several problems for practical use such as, for example, light emission uniformity and manufacturing cost with the above configuration.

The present disclosure has been made in consideration of the above problems, and the present disclosure is to provide a light source device and a vehicle lamp that realize an elongated light emitting region by using a planar light source such as, for example, an organic EL panel.

According to an aspect of the present disclosure, a light source device includes a planar light source provided with a light emitting curved surface; and an optical member that directs light from the light emitting curved surface toward a light emitting elongated region forming an angle with the light emitting curved surface.

Another aspect of the present disclosure also relates to a light source device. The light source device includes a planar light source provided with a light emitting curved surface having a curved front edge; and an optical member that is disposed to face the light emitting curved surface, and defines a light emitting elongated region along the curved front edge.

Still another aspect of the present disclosure also relates to a light source device. The light source device includes a planar light source provided with a light emitting surface; and an optical member that directs light from the light emitting surface toward a light emitting elongated region forming an angle with the light emitting surface. An area of the light emitting surface is larger than an area of the light emitting elongated region.

A vehicle lamp may include any one of the light source devices described above.

According to the present disclosure, a light source device and a vehicle lamp that realize an elongated light emitting region by using a planar light source such as, for example, an organic EL panel, may be provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, preferred exemplary embodiments of the present disclosure will be described with reference to the drawings. Further, the exemplary embodiments are not intended to limit the present disclosure thereto, but are merely illustrative. All features described in the exemplary embodiments or combinations thereof may not be essential for the present disclosure. Identical or corresponding components, members, and processes in each of the drawings will be denoted by the same symbols, and overlapping descriptions thereof will be appropriately omitted. In addition, a scale or a shape of each component illustrated in each of the drawings is conveniently set in order to facilitate descriptions thereof and should not be construed as being limited unless specified.

Figure 1:
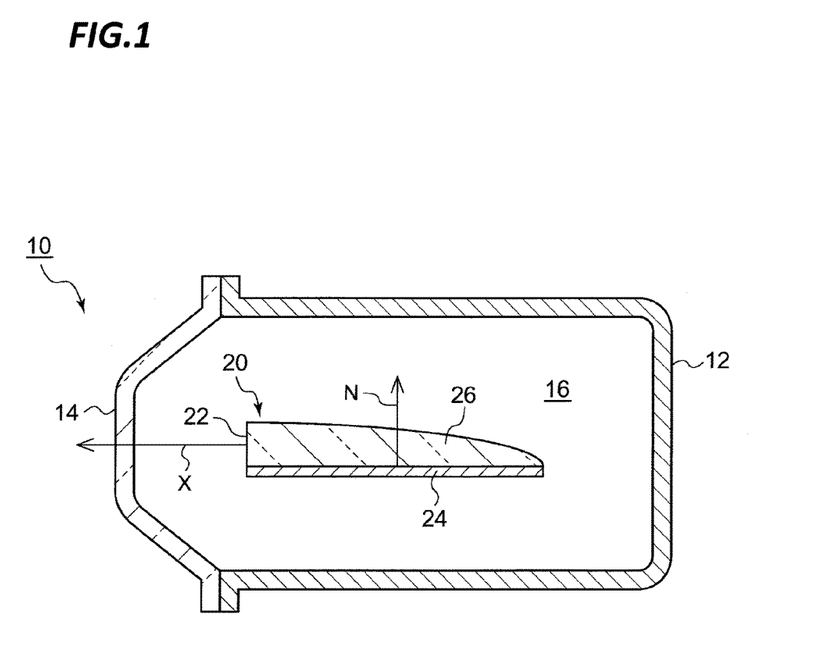
FIG. 1 is a schematic cross-sectional view for explaining a vehicle lamp according to an exemplary embodiment.

FIG. 1 is a schematic cross-sectional view for explaining a vehicle lamp 10 according to an exemplary embodiment. The vehicle lamp 10 is, for example, a tail lamp mounted on a rear portion of a vehicle.

The vehicle lamp 10 includes a lamp body 12 and a transparent cover 14 that covers a front opening of the lamp body 12, and a light source device 20 provided in a lamp chamber 16 formed by the lamp body 12 and the cover 14. The light source device 20 is fixed to the lamp body 12 by a support member (not illustrated).

The light source device 20 includes a light emitting elongated region 22. The light emitting elongated region 22 is positioned at the forefront portion of the light source device 20. The light emitting device 20 emits light from the light emitting elongated region 22 toward the outside of the vehicle lamp 10 through the cover 14. The light emitting elongated region 22 is elongated in a direction perpendicular to the paper surface of FIG. 1. As will be described later, the light emitting elongated region 22 extends in a curved shape, a polygonal line shape, or a linear shape on a certain planar or curved surface.

The light source device 20 includes an organic EL panel 24 and an optical member 26. The organic EL panel 24 and the optical member 26 are disposed behind the light emitting elongated region 22. As will be described later, the optical member 26 is, for example, a transparent lens or a reflector.

The light source device 20 is configured such that a direction X of light emitted from the light emitting elongated region 22 forms an angle with a surface normal direction N of the organic EL panel 24. Therefore, the optical member 26 is configured to change the direction of light incident from the organic EL panel 24 and emit the light. As illustrated, the light emitting direction X coincides with, for example, the front-rear direction of the lamp, and is orthogonal to the surface normal direction N. However, the light emitting direction X is not limited thereto, but may be a direction oblique to the surface normal direction N.

Figure 2A:
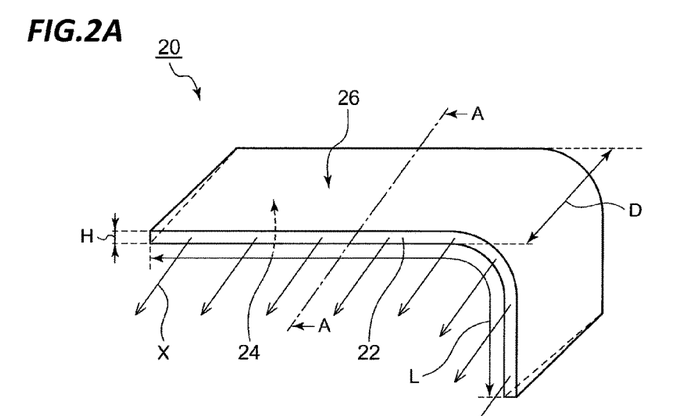
FIG. 2A is a perspective view schematically illustrating an appearance of a light source device illustrated in FIG. 1.
Figure 2B:
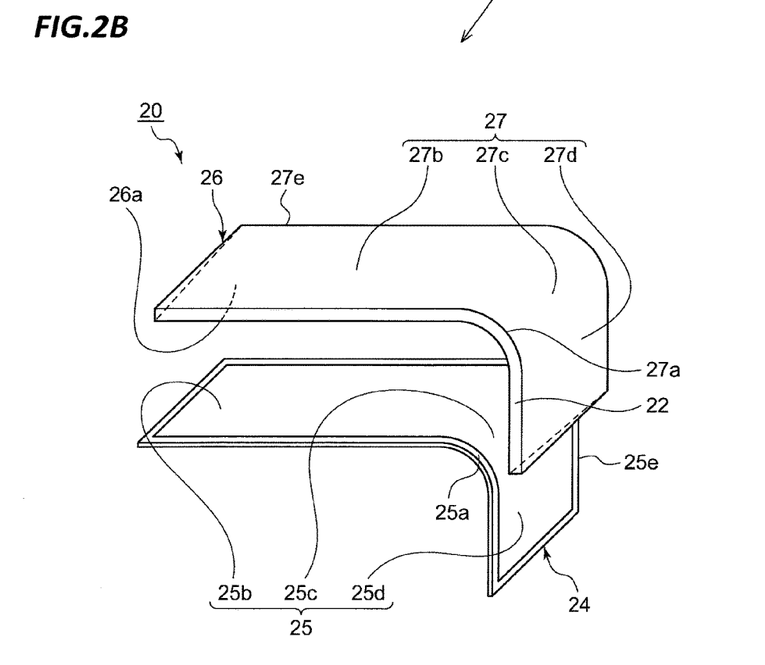
FIG. 2B is a schematic exploded perspective view of the light source device illustrated in FIG. 1.
Figure 3:
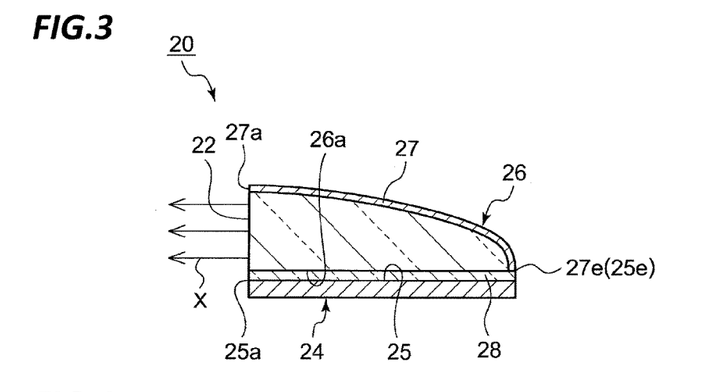
FIG. 3 is a schematic cross-sectional view of the light source device taken along the line A-A of FIG. 2A.
Figure 4:
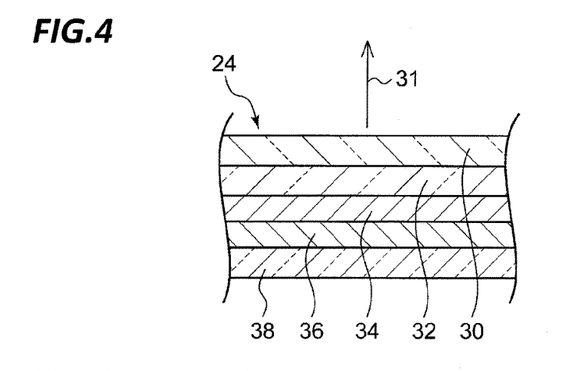
FIG. 4 is a cross-sectional view schematically illustrating a part of a light emitting portion of the light source device in an enlarged scale.

FIG. 2A is a perspective view schematically illustrating the appearance of the light source device 20 illustrated in FIG. 1. FIG. 2B is a schematic exploded perspective view of the light source device 20 illustrated in FIG. 1. FIG. 3 is a schematic cross-sectional view of the light source device 20 taken along the line A-A of FIG. 2A. FIG. 4 is a cross-sectional view schematically illustrating a part of a light emitting portion of the light source device 20 in an enlarged scale.

The light source device 20 is provided with a bent organic EL panel 24. The organic EL panel 24 has a light emitting surface in a curved shape (hereinafter, referred to as a "light emitting curved surface") 25. The optical member 26 directs light from the light emitting curved surface 25 toward the light emitting elongated region 22. The light emitting elongated region 22 is present on a planar surface intersecting perpendicularly with the light emitting curved surface 25. Thus, the light emitting elongated region 22 is perpendicular to the light emitting curved surface 25. The light emitting elongated region 22 may be present on a planar surface forming an arbitrary angle with the light emitting curved surface 25, or may form an arbitrary angle with the light emitting curved surface 25.

The light emitting curved surface 25 has a curved front edge 25a. The optical member 26 is disposed to face the light emitting curved surface 25, and defines the light emitting elongated region 22 along the curved front edge 25a. The light emitting curved surface 25 extends from the light emitting elongated region 22 in a direction opposite to the light emitting direction X from the light emitting elongated region 22 (i.e., from the curved front edge 25a toward the rear side).

The light emitting curved surface 25 has a curved shape formed by bending a planar surface. Therefore, a planar organic EL panel having flexibility, for example, a so-called 2.5-dimensional curved OLED panel may be adopted as the organic EL panel 24. The 2.5-dimensional curved OLED panel has an excellent characteristic that the uniformity of light emission within the light emitting surface is satisfactory and it is freely bent like paper.

The organic EL panel 24 may be a curved organic EL panel formed in advance so as to have the light emitting curved surface 25. That is, in this case, the organic EL panel 24 may not be deformable.

The light emitting curved surface 25 has a first flat portion 25b, a bent portion 25c, and a second flat portion 25d. The bent portion 25c is a 90-degree bent portion that connects the first flat portion 25b to the second flat portion 25d. Therefore, the first flat portion 25b is perpendicular to the second flat portion 25d. The light emitting elongated region 22 extends on a planar surface perpendicular to each of the first flat portion 25b and the second flat portion 25d. The light emitting curved surface 25 may have another curved shape such as, for example, a curved shape without a flat portion.

The optical member 26 is a plate-shaped or bar-shaped transparent lens. The optical member 26 has a facing surface 26a that abuts onto the light emitting curved surface 25. The facing surface 26a has a curved shape along the light emitting curved surface 25. Similarly to the light emitting curved surface 25, the facing surface 26a also has a first flat portion, a bent portion, and a second flat portion. As illustrated in FIG. 3, a transparent adhesive layer 28 (e.g., a transparent adhesive sheet) is interposed between the facing surface 26a and the light emitting curved surface 25, so that the organic EL panel 24 is fixed to the optical member 26.

The optical member 26 includes a reflecting surface 27 on a side opposite to the facing surface 26a. Similarly to the facing surface 26a, the reflecting surface 27 also has a curved shape along the light emitting curved shape 25. The reflecting surface 27 may also be called a reflecting curved surface. The reflecting surface 27 has a curved front edge 27a. Further, the reflecting surface 27 has a first flat portion 27b, a bent portion 27c, and a second flat portion 27d that abut onto the first flat portion 25b, the bent portion 25c, and the second flat portion 25d of the light emitting curved surface 25, respectively. Similarly to the light emitting curved surface 25, the reflecting surface 27 extends from the light emitting elongated region 22 in a direction opposite to the light emitting direction X from the light emitting elongated region 22.

The reflecting surface 27 reflects light from the light emitting curved surface 25 toward the light emitting elongated region 22. The reflecting surface 27 may be a diffuse reflective surface. The reflecting surface 27 may be a reflecting surface formed by vapor-depositing an appropriate metallic material on the surface of the transparent lens, or a reflecting surface formed by applying a texture to the surface of the transparent lens.

The light emitting elongated region 22 is defined between the curved front edge 25a of the light emitting curved surface 25 and the curved front edge 27a of the reflecting surface 27. Therefore, it is possible to realize the light emitting elongated region 22 with a relatively simple configuration of a combination of the organic EL panel 24 and the optical element facing the organic EL panel 24.

Meanwhile, a curved rear edge 27e of the reflecting surface 27 coincides with a curved rear edge 25e of the light emitting curved surface 25. As illustrated in FIG. 3, the reflecting surface 27 is inclined leftward and upward from the curved rear edge 27e toward the curved front edge 27a. Although the reflecting surface 27 illustrated in FIG. 3 is curved, the reflecting surface 27 may be inclined linearly.

An area of the light emitting curved surface 25 is larger than an area of the light emitting elongated region 22. Specifically, a length dimension L of the light emitting curved surface 25 coincides with that of the light emitting elongated region 22, but a depth D of the light emitting curved surface 25 is larger than a height H of the light emitting elongated region 22. Similarly, an area of the reflecting surface 27 is larger than an area of the light emitting elongated region 22. Therefore, it is possible to realize a high-luminance light source device 20 by focusing light emission of a large area on the light emitting elongated region 22.

For example, the depth D of the light emitting curved surface 25 may be five or more times the height H of the light emitting elongated region 22. The height H of the light emitting elongated region 22 may be, for example, 10 mm or less or 20 mm or less. The height H of the light emitting elongated region 22 may be, for example, 1 mm or more or 2 mm or more.

As illustrated in FIG. 4, the organic EL panel 24 has a layered structure. The organic EL panel 24 has a laminated structure of a flexible substrate 30, an anode layer 32, an organic light emitting layer 34, a cathode layer 36, and a sealing layer 38. The flexible substrate 30 is, for example, a flexible glass substrate or a resin substrate having flexibility. The anode layer 32 is, for example, a transparent conductive layer such as ITO. The cathode layer 36 is, for example, a metal layer (e.g., a metal vapor deposition layer) made of aluminum. In this case, since the cathode layer 36 is opaque, the light emission direction of the organic EL panel 24 becomes a direction from the organic light emitting layer 34 to the outside through the anode layer 32 and the flexible substrate 30, as indicated by an arrow 31 in FIG. 4. The flexible substrate 30 may be adjacent to the cathode layer 36, and the sealing layer 38 may be adjacent to the anode layer 32.

As described above, the light source device 20 is provided with the light emitting elongated region 22 forming an angle with the light emitting curved surface 25 of the organic EL panel 24. The light from the light emitting curved surface 25 is directed to the light emitting elongated region 22 by the optical member 26. Therefore, it is possible to realize the light emitting elongated region 22 having uniform light emission, similarly to the organic EL panel 24.

The height H of the light emitting elongated region 22 may be, for example, 10 mm or less, and the organic EL panel 24 may have a depth D five or more times the height H. Therefore, it is possible to realize an ultra-thin and high-luminance light source device 20 of 10 mm or less.

In addition, the light emitting elongated region 22 may be designed in any shape.

Figure 5:
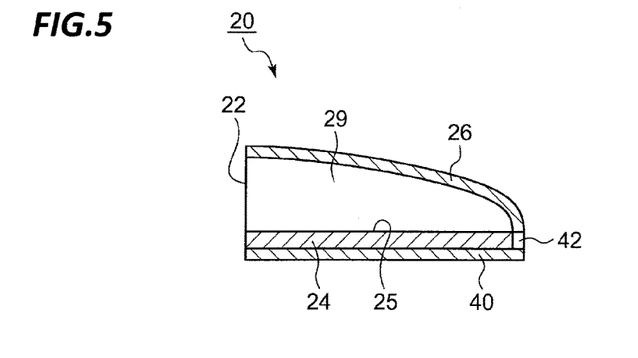
FIG. 5 is a schematic cross-sectional view illustrating another exemplary light source device.

FIG. 5 is a schematic cross-sectional view illustrating another example of the light source device 20. The light source 20 illustrated in FIG. 5 includes a reflector as the optical member 26. An air layer 29 is interposed between the reflector and the organic EL panel 24. Even in this manner, it is possible to direct the light from the light emitting curved surface 25 toward the light emitting elongated region 22.

Further, as illustrated in FIG. 5, a holder 40 may be attached to the optical member 26 in order to hold the organic EL panel 24. An insertion slot 42 may be formed in the holder 40. The organic EL panel 24 may be inserted from the rear side through the insertion slot 42 when the light source device 20 is manufactured.

Figure 6:
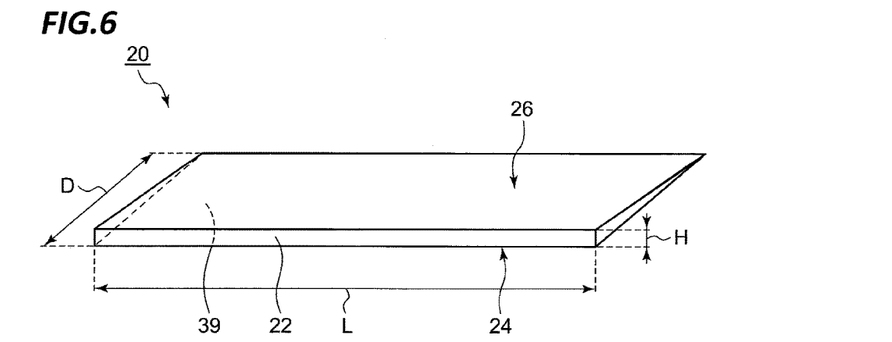
FIG. 6 is a schematic outline view illustrating another exemplary light source device.

FIG. 6 is a schematic outline view illustrating another example of the light source device 20. As illustrated in FIG. 6, the light source device 20 may include a linear light emitting elongated region 22. That is, the light source device 20 may include an organic EL panel 24 having a flat light emitting surface 39, and an optical member 26 that directs light from the flat light emitting surface 39 to the light emitting elongated region 22. A depth D of the flat light emitting surface 39 is larger than the height H of the light emitting elongated region 22. A length L of the flat light emitting surface 39 is equal to the length of the light emitting elongated region 22. Therefore, an area of the flat light emitting surface 39 is larger than the area of the light emitting elongated region 22.

Meanwhile, the lowest light intensity of a high mount stop lamp is 25 candelas. When a commercially available OLED panel of, for example, 2,000 candelas/$m^2$ is used to realize the lowest luminous intensity, an area of 125 $cm^2$ (i.e., 5 cm×25 cm) is required. When such a large-area OLED panel is installed by a known method, it is unrealistic because the backward visibility is significantly obstructed.

However, according to the configuration illustrated in FIG. 6, the depth D is 5 cm, but it is possible to realize the same luminous intensity with an area of 25 $cm^2$ or less (i.e., the height H of 10 mm or less and the length L of 25 cm). Therefore, such a configuration is suitable for, for example, a high mount stop lamp.

Figure 7:
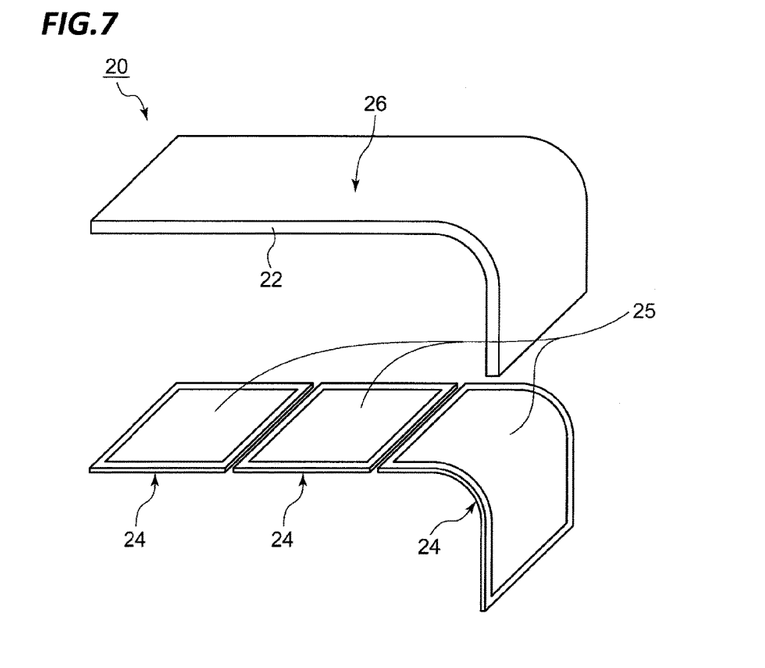
FIG. 7 is a schematic exploded perspective view illustrating another exemplary light source device.

FIG. 7 is a schematic exploded perspective view illustrating another example of the light source device 20. The light source device 20 illustrated in FIG. 7 includes a plurality of organic EL panels 24 that forms a light emitting curved surface 25, and an optical member 26. The plurality of organic EL panels 24 are arranged in the longitudinal direction of the light emitting elongated region 22. A part of the plurality of organic EL panels 24 is flat and the other part is curved. Alternatively, each of the plurality of organic EL panels 24 may be a curved surface or a planar surface.

The plurality of organic EL panels 24 may be individually driven. For example, the plurality of organic EL panels 24 are sequentially driven from one end of the light emitting elongated region 22 to the other end. Such a configuration is suitable for, for example, a sequential turn lamp.

A part of the plurality of organic EL panels 24 may emit light of a first color and the other part may emit light of a second color that is different from the first color. For example, one organic EL panel 24 may be a red light emitting panel and another organic EL panel 24 may be an amber (yellow) light emitting panel.

The plurality of organic EL panels may be arranged in the depth direction of the light source device 20 as necessary.

Figure 8:
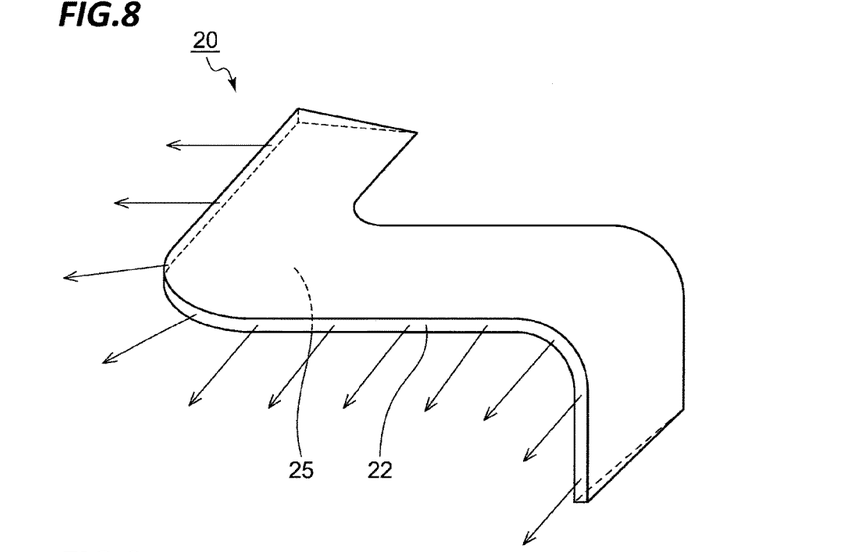
FIG. 8 is a schematic perspective view illustrating another exemplary light source device.

FIG. 8 is a schematic perspective view illustrating another example of the light source device 20. In the above-described exemplary embodiments, the light emitting elongated region 22 extends on a planar surface intersecting with the light emitting curved surface 25, but the present disclosure is not limited thereto. The light emitting elongated region 22 may extend out of the planar surface. As illustrated in FIG. 8, the light emitting elongated region 22 may extend along another curved surface intersecting with the light emitting curved surface 25. The light emitting elongated region 22 is bent downward at the right end in the figure in the same manner as in the above-described exemplary embodiments, but in addition to this, it is bent backward at the left end in the figure. Therefore, it is possible to form the light emitting elongated region 22 extending in a three-dimensional curved shape.

Figure 9:
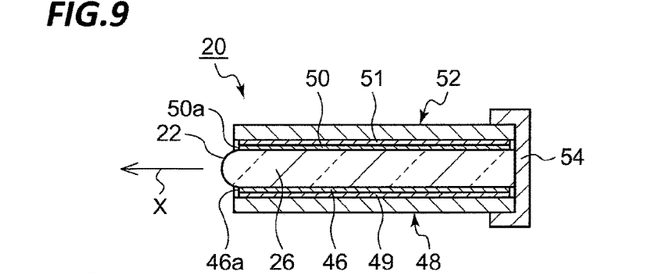
FIG. 9 is a schematic cross-sectional view illustrating another exemplary light source device.

FIG. 9 is a schematic cross-sectional view illustrating another example of the light source device 20. The light source device 20 illustrated in FIG. 9 has a curved light emitting elongated region 22, similarly to each of the above-described exemplary embodiments. The light emitting elongated region 22 extends in a direction perpendicular to the paper surface. As illustrated in FIG. 8, the light emitting elongated region 22 may extend in a three-dimensional curved shape.

The light source device 20 includes a first organic EL panel 48 having a first light emitting curved surface 46, a second organic EL panel 52 having a second light emitting curved surface 50, an optical member 26 as a transparent lens, and a reflector 54. The first organic EL panel 48 and the second organic EL panel 52 are arranged with the optical member 26 interposed therebetween such that the first light emitting curved surface 46 and the second light emitting curved surface 50 face each other. The reflector 54 is arranged adjacent to the optical member 26 on a side opposite to the light emitting elongated region 22 in the light emitting direction X.

The light emitting elongated region 22 is defined along a first curved front edge 46a of the first light emitting curved surface 46 and a second curved front edge 50a of the second light emitting curved surface 50. As illustrated, the optical member 26 may have a convex curved surface in the light emitting elongated region 22 in the light emitting direction X. Further, as in the above-described exemplary embodiments, the optical member 26 may be flat in the light emitting elongated region 22. Alternatively, the optical member 26 may have a concave curved surface in the light emitting elongated region 22 in the light emitting direction X.

Similarly to each of the above-described exemplary embodiments, the area of each of the first light emitting curved surface 46 and the second light emitting curved surface 50 is larger than the area of the light emitting elongated region 22.

The first organic EL panel 48 and the second organic EL panel 52 may be fixed to the reflector 54. Alternatively, similarly to the exemplary embodiment illustrated in FIG. 3, each of the first organic EL panel 48 and the second organic EL panel 52 may be fixed to the optical member 26 by a transparent adhesive layer.

The first organic EL panel 48 serves as not only a planar light source of the light source device 20 but also an optical member for directing the light from the second organic EL panel 52 to the light emitting elongated region 22. Therefore, the first organic EL panel 48 includes a first reflective layer 49. The first reflective layer 49 may be, for example, the cathode layer 36 made of a metal (e.g., aluminum) illustrated in FIG. 4.

Similarly, the second organic EL panel 52 serves as not only a planar light source of the light source device 20 but also an optical member for directing the light from the first organic EL panel 48 to the light emitting elongated region 22. Therefore, the second organic EL panel 52 includes a second reflective layer 51. The second reflective layer 51 may be, for example, the cathode layer 36 made of a metal (e.g., aluminum) illustrated in FIG. 4.

Further, the reflector 54 functions as an optical member for directing the light from the first organic EL panel 48 and the second organic EL panel 52 to the light emitting elongated region 22. Instead of the reflector 54, the optical member 26 may have a reflecting surface (e.g., a diffuse reflecting surface) on a surface opposite to the light emitting elongated region 22 in the light emitting direction X.

The light emitting elongated region 22 may be linear. In this case, the first organic EL panel 48 may have a first light emitting flat surface, and the second organic EL panel 52 may have a second light emitting flat surface.

According to the light source device 20 illustrated in FIG. 9, the organic EL panels are provided on both sides of the optical member 26. Thus, it is possible to realize a high-luminance light emitting elongated region 22.

Figure 10:
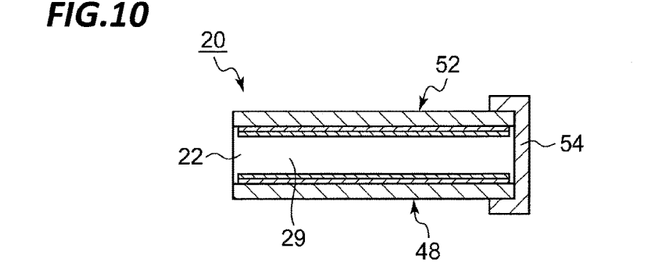
FIG. 10 is a schematic cross-sectional view illustrating another exemplary light source device.

FIG. 10 is a schematic cross-sectional view illustrating another example of the light source device 20. In the light source device 20 illustrated in FIG. 10, the optical member 26 in the light source device 20 illustrated in FIG. 9 is omitted. An air layer 29 is interposed between the first organic EL panel 48 and the second organic EL panel 52.

Figure 11:
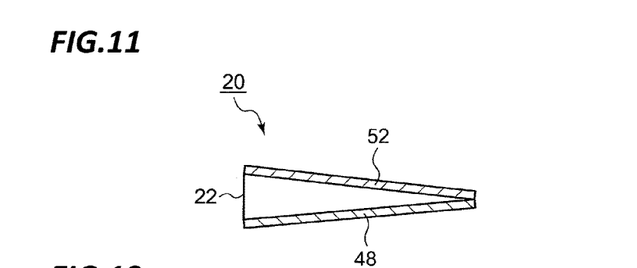
FIG. 11 is a schematic cross-sectional view illustrating another exemplary light source device.

FIG. 11 is a schematic cross-sectional view illustrating another example of the light source device 20. In the light source device 20 illustrated in FIG. 11, the reflector 54 in the light source device 20 illustrated in FIG. 10 is omitted. The first organic EL panel 48 and the second organic EL panel 52 are coupled to each other at their rear edges opposite to the light emitting elongated regions 22.

Figure 12:
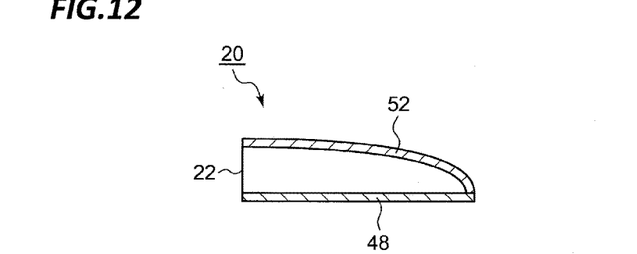
FIG. 12 is a schematic cross-sectional view illustrating another exemplary light source device.

FIG. 12 is a schematic cross-sectional view illustrating another example of the light source device 20. In the light source device 20 illustrated in FIG. 11, a second organic EL panel 52 is provided in place of the optical member 26 (i.e., the reflector) in the light source device 20 illustrated in FIG. 5. The first organic EL panel 48 and the second organic EL panel 52 are coupled to each other at their rear edges opposite to the light emitting elongated regions 22.

Similarly to the light source device 20 illustrated in FIG. 9, in the light source device 20 illustrated in FIGS. 10 to 12, the first organic EL panel 48 serves as not only a planar light source of the light source device 20 but also an optical member for directing the light from the second organic EL panel 52 to the light emitting elongated region 22. The first organic EL panel 48 may be regarded as a reflector having a first reflective layer (e.g., a metal vapor-deposited layer of, for example, aluminum) for reflecting light emitted from the light emitting surface of the second organic EL panel 52. Further, the second organic EL panel 52 serves as not only a planar light source of the light source device 20 but also an optical member for directing the light from the first organic EL panel 48 to the light emitting elongated region 22. The second organic EL panel 52 may be regarded as a reflector having a second reflective layer (e.g., a metal vapor-deposited layer of, for example, aluminum) for reflecting light emitted from the light emitting surface of the first organic EL panel 48. Here, the first reflective layer and the second reflective layer may be the cathode layers 36 illustrated in FIG. 4.

Similarly to the light source device 20 illustrated in FIG. 9, in the light source device 20 illustrated in FIGS. 10 to 12, it is possible to realize a high-luminance light emitting elongated region 22. Further, the light source device 20 illustrated in FIGS. 11 and 12 has an advantage that a linear light emitting elongated region 22 may be realized with a simple configuration.

Figure 13:
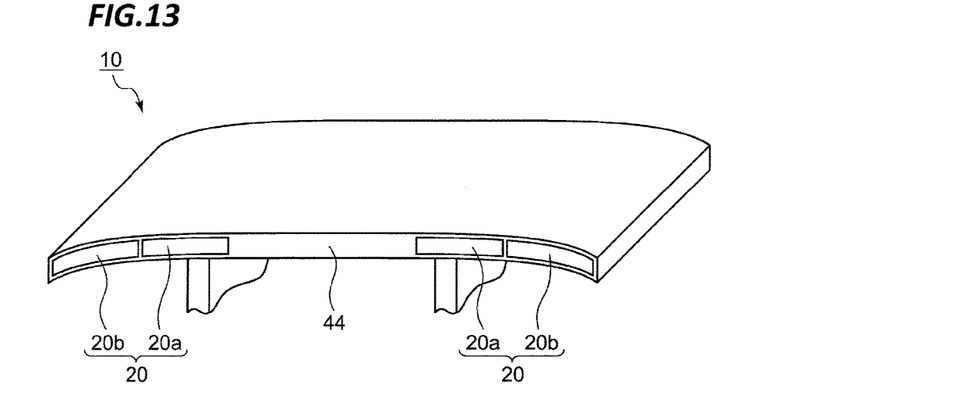
FIG. 13 is a schematic perspective view illustrating another exemplary vehicle lamp.

FIG. 13 is a schematic perspective view illustrating another example of the vehicle lamp 10. As illustrated in FIG. 13, the vehicle lamp 10 may include a plurality of light source devices 20. The plurality of light source devices 20 are incorporated in an ultra-thin structure 44 such as, for example, a rear wing or a rear spoiler. The structure 44 has a curved shape.

In this case, some light source devices 20a may emit light of a first color (e.g., red), and other light source devices 20b may emit light of a second color (e.g., amber or yellow) that is different from the first color. Therefore, the light source device 20a may be used as a tail lamp and a stop lamp, and the light source device 20b may be used as a turn lamp.

In addition to the specific type of lamps exemplified in the above-described exemplary embodiments, the light source device 20 may be applied to any type of vehicle marker lamp such as, for example, a tail lamp, a stop lamp, a turn lamp, a clearance lamp, or a daytime running lamp, or other vehicle lamps.

In the above-described exemplary embodiments, the light source device 20 includes one or more organic EL panels, but the light source device 20 may include one or more planar light sources of other types such as, for example, LED panels, together with or instead of the organic EL panels.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A light source device comprising:
    a planar light source provided with a light emitting curved surface; and
    an optical member that directs light from the light emitting curved surface toward a light emitting elongated region formed on a forward edge of the optical member, the light emitting elongated region having a planar surface and being formed perpendicular with the light emitting curved surface,
    wherein the light emitting elongated region extends along another curved surface intersecting with the light emitting curved surface.

2. The light source device of claim 1, wherein an area of the light emitting curved surface is larger than an area of the light emitting elongated region.

3. The light source device of claim 1, wherein the light emitting curved surface has a curved shape formed by bending a planar surface.

4. The light source device of claim 1, wherein the planar light source includes a plurality of organic EL panels forming the light emitting curved surface.

5. The light source device of claim 1, wherein the optical member has a reflecting curved surface that reflects the light from the light emitting curved surface toward the light emitting elongated region, and
    the light emitting elongated region is defined between a curved front edge of the light emitting curved surface and a curved front edge of the reflecting curved surface.

6. A vehicle lamp comprising the light source device of claim 1.

7. The light source device of claim 1, wherein the optical member includes an air layer.

8. A light source device comprising:
    a planar light source provided with a light emitting curved surface having a curved front edge; and
    an optical member that is disposed to face the light emitting curved surface, and defines a light emitting elongated region along the curved front edge,
    wherein the light emitting elongated region extends along another curved surface intersecting with the light emitting curved surface.

9. The light source device of claim 8, wherein an area of the light emitting curved surface is larger than an area of the light emitting elongated region.

10. The light source device of claim 8, wherein the light emitting curved surface has a curved shape formed by bending a planar surface.

11. The light source device of claim 8, wherein the planar light source includes a plurality of organic EL panels forming the light emitting curved surface.

12. The light source device of claim 8, wherein the optical member has a reflecting curved surface that reflects the light from the light emitting curved surface toward the light emitting elongated region, and
    the light emitting elongated region is defined between a curved front edge of the light emitting curved surface and a curved front edge of the reflecting curved surface.

13. A vehicle lamp comprising the light source device of claim 8.

14. The light source device of claim 8, wherein the optical member includes an air layer.

15. A light source device comprising:
    a first planar light source provided with a first curved light emitting surface;
    a second planar light source provided with a second curved light emitting surface facing the first planar light source; and
    an optical member disposed between the first planar light and the second planar light source that directs light from the first and second curved light emitting surfaces toward a light emitting elongated region formed in a forward portion of the optical member,
    wherein the light emitting elongated region extends along another curved surface intersecting with the first and second curved light emitting surfaces.

16. A vehicle lamp comprising the light source device of claim 15.

17. The light source device of claim 15, wherein an area of the light emitting curved surface is larger than an area of the light emitting elongated region.

18. The light source device of claim 15, wherein the optical member includes an air layer.

* * * * *